March 20, 1934.  J. TOLLONITSCH  1,951,953
SPRING EXPANDING DEVICE
Filed July 14, 1933
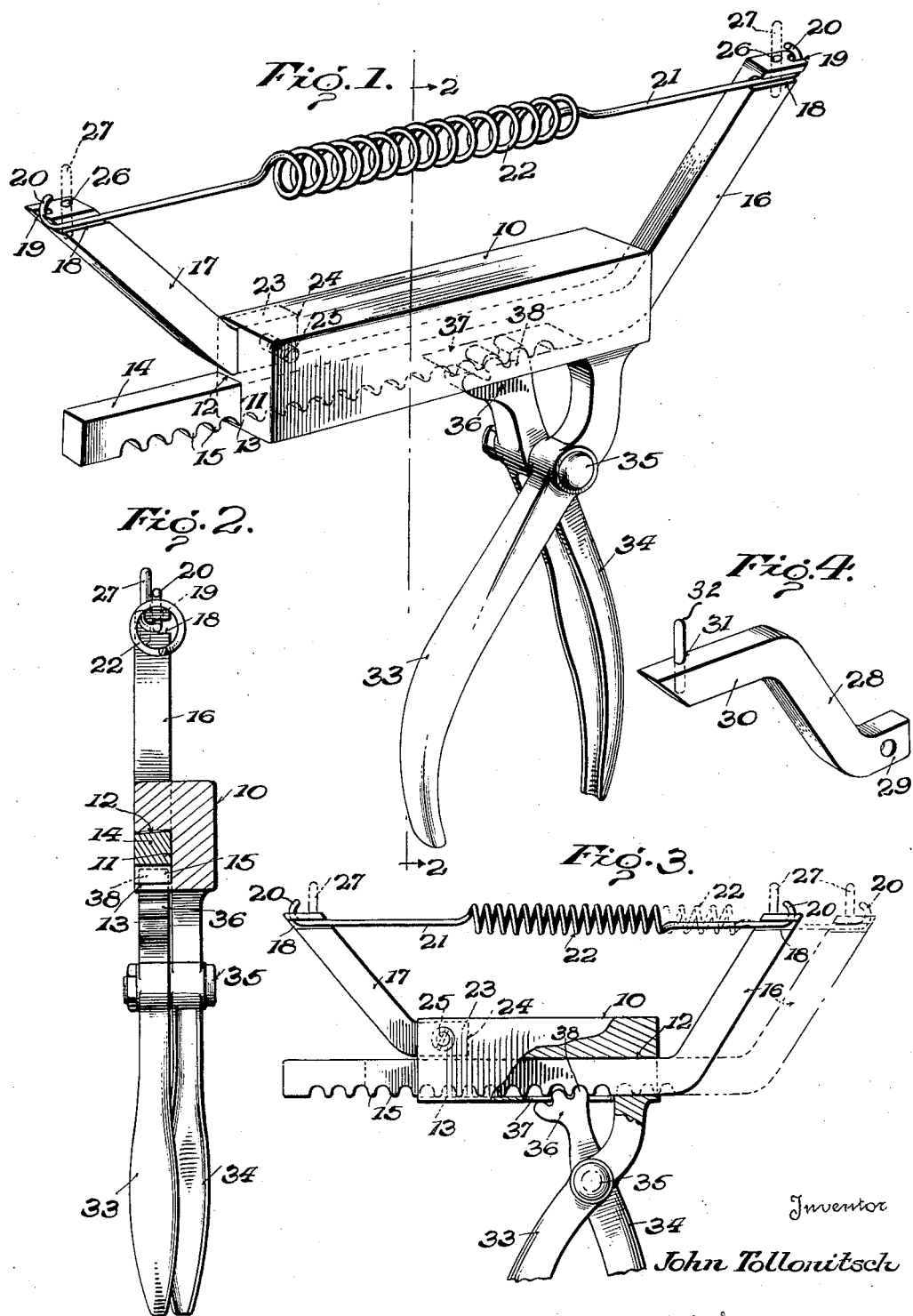

Patented Mar. 20, 1934

1,951,953

UNITED STATES PATENT OFFICE 1,951,953

SPRING EXPANDING DEVICE

John Tollonitsch, Clifton, N. J.

Application July 14, 1933, Serial No. 680,475

6 Claims. (Cl. 29—87.1)

My invention relates to a tool for expanding retractile coil springs, to place the same within or remove the same from operative connection with coacting parts.

An important object of the invention is to provide a tool of the above-mentioned character, which may be employed to properly expand a retractile coil spring without liability of injury to the spring.

A further object of the invention is to provide a tool of the above-mentioned character, which is adjustable for handling springs of various lengths.

Other objects and advantages of the invention will be apparent during the course of the following description.

In the accompanying drawing, forming a part of this specification, and in which like numerals are employed to designate like parts throughout the same, Figure 1 is a perspective view of a spring expanding tool embodying my invention, Figure 2 is a transverse section taken on line 2—2 of Figure 1, Figure 3 is a side elevation of the tool, parts in section and parts broken away, illustrating the mode of operation of the tool, and, Figure 4 is a perspective view of a modified form of arm.

In the drawing, wherein for the purpose of illustration is shown a preferred embodiment of my invention, the numeral 10 designates a body portion, having a longitudinal groove or recess 11, formed upon one side thereof. The top wall 12 of this groove is preferably transversely inclined or beveled, extending downwardly, as shown, while the bottom wall 13 of the groove is preferably horizontal. This groove receives a sliding rack 14, having teeth 15. It is thus seen that the arrangement is such that the rack 14 cannot move laterally out of the groove, and has slidable engagement with the body portion 10, to be shifted longitudinally thereof. Preferably formed integral with one end of the rack 14 is an arm 16, disposed opposite an arm 17. These arms 16 and 17 diverge upwardly from the body portion 10, as shown. Each arm 16 and 17 is provided adjacent to its free end, and upon one side with a horizontal groove 18, which leads into a vertical notch 19, formed in the free end of the arm, as shown. These grooves and notches receive the hooked ends 20 carried by the ends 21, of retractile coil springs 22. The arm 17 is preferably rigidly detachably secured to the body portion 10, and for this purpose it is provided with a horizontal shank 23, adapted to be inserted within a recess or groove 24, formed in the body portion 10, and held within this recess by a bolt 25, or the like.

The arms 16 and 17 are also provided at their free ends with openings 26, to rigidly and detachably receive pins 27.

The arm 17 may be removed from the body portion 10 and an arm 28 substituted therefor, the arm 28 having a shank 29 to fit within the recess or groove 24 and to be held therein by the bolt 25. The arm 28 has a horizontal extension 30, having an opening 31 to receive a pin 32, as shown.

A lever arm 33 is rigidly secured to the end of the housing 10, preferably adjacent to the arm 16, and is preferably formed integral with the housing. A companion lever arm 34 crosses the lever arm 33, and is pivotally connected therewith, as shown at 35. The lever arm 34 has a segmental head 36, arranged to operate within an elongated opening 37, which leads into the groove 11. This segmental head has teeth 38 to engage with the rack teeth 15, as shown.

In the use of the tool, with the arm 17 attached to the body portion 10, the lever arm 34 is swung from the lever arm 33, whereby arm 16 is moved inwardly toward arm 17. When the arm 16 is in the innermost position, the teeth 38 may be moved out of engagement with the teeth 15. This would permit of the outward movement of the arm 16 from the arm 17 to different selected positions, depending upon the length of the spring to be handled. When the arm 16 is moved to the selected outer position, the lever arm 34 may be swung inwardly toward the lever arm 33, until teeth 38 can engage the teeth 15. The hooked ends 20 are now applied within the grooves and notches 18 and 19, the free ends of the hooks extending upwardly beyond the ends of the arms 16 and 17, and the pins 27 being removed, Figures 1 and 3. The operator now grasps the lever handles 33 and 34 in the hand, and by squeezing the same together, the rack bar 14 is moved longitudinally to the right, and arm 16 shifted from arm 17, thereby expanding the spring 22. The ends of the hooks may now be inserted in the usual eyes formed in the shoes of an automobile brake. As is well known, the internal expanding type of brake for automobiles embody a drum and retarding means for the rotation of the drum, which retarding means includes a pair of brake shoes arranged within the drum, and drawn together by powerful spring or springs. These springs have hooked ends which are inserted within eyes formed in the brake shoes. The tool may be manipulated as above explained for bringing the free ends of the hooks 20 within these eyes of the brake drum. The tool may also be employed to remove a spring like the spring 22, having hooked ends 20 from engagement with the brake drums, and when this is desired, the pins 27 are inserted within the openings 26, and these pins are engaged within the hooked ends 20 of the spring previously applied to the brake shoe, and the spring is then expanded by moving the arms 33 and 34 inwardly.

The arm 28 is substituted for the arm 17, and is used behind a brake shoe where pins are used to attach the springs to the brake shoe.

It is to be understood that the form of my invention herewith shown and described, is to be taken as the preferred example of the same, and that various changes in the shape, size and arrangement of parts may be resorted to without departing from the spirit of the invention, or the scope of the subjoined claims.

Having fully described my invention, what I claim is:

1. A tool for expanding retractile coil springs, comprising a body portion, a member slidable longitudinally of the body portion and carrying an arm for movement therewith, a second arm arranged opposite the first named arm and immovably attached to the body portion, said arms having means for engaging with a retractile coil spring for expanding the same, a lever arm rigidly attached to the body portion, and a second lever arm crossing the first named lever arm and pivotally connected therewith and having engagement with the sliding member to shift the sliding member and the arm carried thereby outwardly when the second lever arm is moved inwardly toward the first named lever arm.

2. A tool for expanding retractile coil springs, comprising a body portion, a bar slidably engaging the body portion and carrying an arm, a second arm arranged opposite the first named arm and connected with the body portion, said arms having means for engagement with a retractile coil spring, a lever arm attached to the body portion, and a second lever arm crossing the first named lever arm and pivotally connected therewith and engaging the slidable bar to shift the same.

3. A tool for expanding retractile coil springs, comprising a body portion, a rack bar having teeth and slidably engaging the body portion and carrying an arm, a second arm arranged opposite the first named arm and connected with the body portion, said arms being adapted for engagement with the end portions of a retractile coil spring, a lever arm attached to the body portion, and a second lever arm crossing the first named lever arm and pivotally connected therewith and having a part for engagement with the teeth of the rack bar.

4. A tool for expanding retractile coil springs, comprising a body portion, a rack bar having teeth and slidably engaging the body portion and carrying an arm, a second arm arranged opposite the first named arm and attached to the body portion, said arms being adapted for engagement with the end portions of a retractile coil spring, a lever arm attached to the body portion, and a second lever arm crossing the first named lever arm and provided at its inner end with a head having teeth to engage with the teeth of the rack bar, the arrangement being such that the teeth of the head may be moved out of engagement with the teeth of the rack bar to permit of the independent adjustment of the rack bar.

5. A tool for expanding retractile coil springs, comprising a body portion, a bar having slidable engagement with the body portion and carrying an arm, said arm being provided near its end with a groove extending longitudinally of the body portion and a notch extending transversely of the body portion and leading into the groove, a second arm mounted upon the body portion and arranged opposite the first named arm and being provided near its end with a groove extending longitudinally of the body portion and a notch extending transversely of the body portion and leading into the groove, a lever arm attached to the body portion, and a second lever arm crossing the first-named lever arm and pivotally connected therewith and engaging the slidable bar to shift the same.

6. A tool of the character described, comprising a body portion, having a recess, a bar slidably engaging the body portion, an arm carried by the bar and having means to engage with the hooked end of a retractile coil spring, a second arm having a shank for insertion within the recess and provided at its outer end with an extension having an opening to receive a pin, a pin in said opening adapted to engage the other hooked end of said spring, means to secure the shank to the body portion within the recess, and means to move the bar with relation to the body portion.

JOHN TOLLONITSCH.